Figure 1:
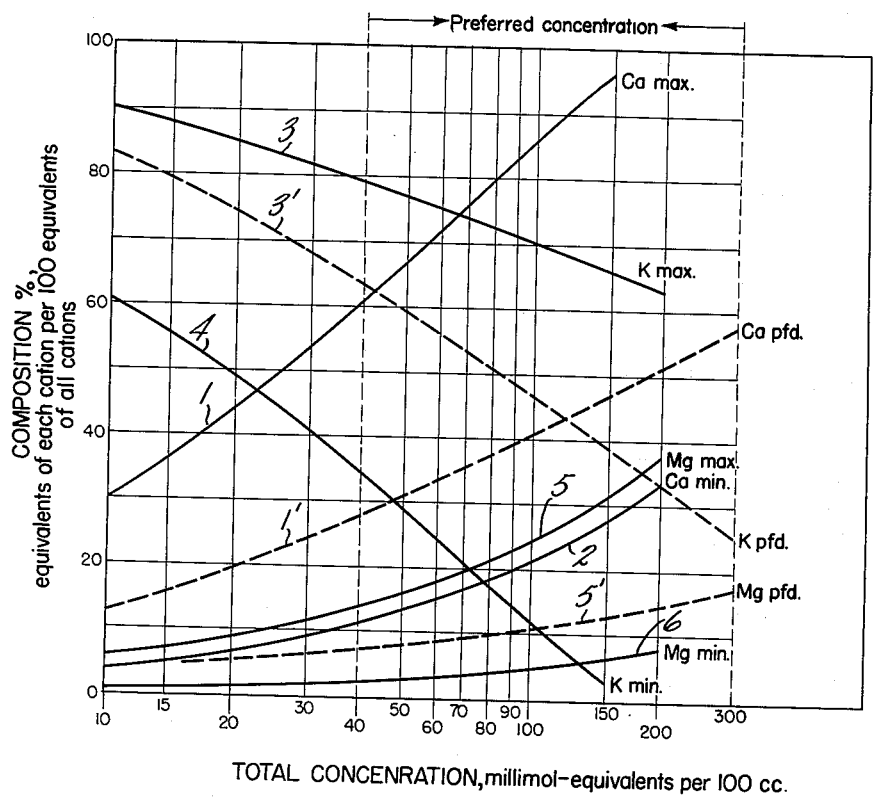

United States Patent Office 2,990,284
Patented June 27, 1961

2,990,284
PRODUCTION OF MILK PRODUCTS
Ernest H. Freund, Sayville, Kelvin Domovs, Oakdale, and Edward R. Jensen, Sayville, N.Y., assignors to National Dairy Products Corporation, New York, N.Y., a corporation of Delaware
Filed Sept. 13, 1956, Ser. No. 609,726
17 Claims. (Cl. 99—60)

The present invention relates to the production of a milk product, in which the concentration of one or of a plurality of cations (such as sodium or magnesium) are either increased or decreased, without changing the total concentration of cations in said milk product. It relates also to the production of a low-sodium milk by the use of a cation exchange resin.

The dairy and dietetic industries have been greatly interested in the production of milk having a reduced sodium content, since such a milk is quite useful in those dietetic cases where the ingestion of sodium should be as small as possible. Uses of milks which are high and low in magnesium have also been developed lately and are based on the altered gelation properties of such milk. Many processes have been developed heretofore for the production of a low-sodium milk, the most important of which are discussed below.

A method for replacing sodium in milk is disclosed in U.S. Patent No. 2,511,825, issued June 30, 1950, to R. J. Myers. This method consists in treating milk with a cation exchanger which is in ammonium cycle. By this treatment not only sodium, but also potassium and calcium are replaced by ammonium ions. Calcium and potassium hydroxides are then added to the milk to replace the ammonium ions and to reconstitute the metal content.

Other methods for the removal of sodium from milk have been suggested in booklet IE-4-52 by Rohm & Haas Co., Philadelphia, Pa. According to one of these methods, milk is completely deionized by treating it with a mixture of cation and anion exchange resins in a monobed system. This method has a marked influence on the flavor and the nutritional value of milk, since not only a large part of the vitamin acids and vitamin bases are removed by this process, but also part of the calcium-phosphorous complex is destroyed, which is considered to be of great nutritional importance. (Journal of Dairy Science, 30, 744 (1947).)

Another method which is suggested in this booklet and which is named "Hardening Treatment" consists in separately treating and blending three fractions of milk; one fraction has all the cations replaced by calcium, another fraction has all the cations replaced by magnesium, and the last fraction has all the cations replaced by potassium. A blend in the correct ratio is supposed to produce a milk which is low in sodium and has an unaltered total salt content. However, this method is cumbersome and difficult to perform.

A further method of producing milk low in sodium content is described in U.S. Patent No. 2,708,632, issued May 17, 1955, to Edwin G. Stimpson. This method is also based on the removal of cations and anions from milk by a monobed treatment and lowers the ash content to less than 40% of that of natural milk.

Chaney et al. (U.S. Patent No. 2,707,152) discloses a technique for replacing the sodium of milk by potassium, and keeping a portion of the original calcium in the milk. The exchanger was conditioned to a mixed potassium-calcium cycle, and, after each time it was used to treat milk, was incompletely regenerated with a dilute (1–5%) potassium chloride solution. The Ca-K ratio in the exchanger was specified as between 0.2 and 0.5. Any kind of ion exchanger could be used. No mixed-cation regenerants were specified.

We have found that these procedures using well-known commercially available cation-exchange resins afford milks only of substantially reduced calcium and magnesium content, which are not curdled by rennet, and which lack normal milk flavor because of the changed mineral composition. The carboxylic resins give even more abnormal milk than do the sulfonic resins.

Accordingly, it is an object of the present invention to increase or decrease the concentration of one or a plurality of the cations of a milk product without changing the total concentration thereof.

It is also an object of the present invention to provide a cation exchange process for producing a low-sodium milk, i.e., one preferably containing about 40 p.p.m. or less of sodium, having the ionic concentration ratios of potassium, calcium, and magnesium substantially unaltered from the ionic concentration ratios of these ions in normal milk so that the product is coagulable by rennet and has the flavor and appearance of normal milk containing sodium ions. The invention also provides a cation-exchange resin and regenerant useful in the process.

It is another object of the present invention to provide a cation-exchange process for producing a low-sodium milk having the levels of calcium and magnesium substantially unaltered from the levels in normal milk, and the sodium replaced substantially by potassium, to the extent that the treated milk preferably contains about 40 p.p.m. or less of sodium.

Still another object of the present invention is the preparation of a regenerant solution for a cation-exchange resin in equilibrium with the desired milk, said regenerant solution having a total salt content preferably between 40 and 300 m.eq./100 cc. of solution.

It is also an object of the present invention to replicate any desired composition of a plurality of ions in milk without changing the total number of mineral ash equivalents.

Still another object is to provide a cation-exchange resin for producing a milk having an increased, or a decreased content of magnesium ions, as desired, and a regenerant for such exchange resin.

The metals which occur in substantial amounts in milk (e.g., over 1 milligram in 100 cubic centimeters of milk) are, according to averaged reports of the literature, per 100 cubic centimeters:

| Metals | Milligrams | Milli-Equivalents | Milli-Equivalents per 100 Milli-Equivalents |
|---|---|---|---|
| Calcium | 137 | 6.84 | 48.5 |
| Magnesium | 13 | 1.07 | 7.6 |
| Potassium | 142 | 3.63 | 25.7 |
| Sodium | 59 | 2.57 | 18.2 |
| Total | 351 | 14.11 | 100 |

However, a part of the above metal constitutents is not present in ionized form in the milk, but is bound with the protein, or is otherwise not readily available in ionized state. Thus, the concentration of these metals does not correspond to their ionic concentration or activity.

If milk is in equilibrium with a cation-exchange resin the composition of the milk and of the resin do not change, even after prolonged contact. The relative amounts of calcium, magnesium, potassium and sodium which are bound on the resin are characteristic measures for the relative activities of these ions in milk. However, any influence which would change the activity of these cations in milk, e.g. change of temperature, pH, heat treatment, ionic strength, etc., would cause changes in the composition of the resin.

It is believed that at equilibrium the chemical potential for each cation is the same in both resin and solution phases. However, if only some of the cation species are in equilibrium with the same cation species bound on the resin and other cation species present in milk are not bound in the resin, or are not bound in the resin in sufficient amount to establish equilibrium, then an exchange will take place which will be directed by the mass law. Thus, it is possible, by using a resin which is in equilibrium with milk only in relation to some cation species, to cause changes in the cationic content of the milk in a desired direction. Hence, by the process of the invention, it is possible to remove sodium from milk by bringing milk in contact with an ion-exchange resin which is, in relation to all cations except one, for example sodium, i.e., calcium, magnesium, and potassium, in equilibrium with milk.

Our process differs from prior art in that it shows exactly how to produce products of any closely specified composition and properties, by means of treating the solution to be modified with a resin the composition of which is nearly in equilibrium with the specified product.

We work at close to equilibrium conditions, which enable close control of the composition of the treated milk, and which avoid any disturbances to the properties of milk which might result during even temporarily abnormal conditions, such as, for example, might arise during some non-equilibrium process which requires mixing high-calcium and low-calcium milks.

As cow milk is a food of long-established dietary importance the reasons for the value of which are not completely understood we disturb the biological value least, if we alter its mineral composition as little as possible, in the course of our preparing a low-sodium milk to be used in therapeutic diets.

Our processes enable one to make low-sodium milk which has practically normal ionic activity ratios of calcium: magnesium and also calcium: potassium or calcium: magnesium: potassium, if so desired. It also enables us to make low-sodium milks in which the concentration of one or two of the major ash constituents is practically unchanged.

(A) One of these processes involves replicating all the ionic activities of the milk in a prototype liquid of equivalent total ionic strength so that the ionic concentration as well as the ionic activities of the milk are replicated.

In the following, the necessary steps of this replicating process are at first briefly mentioned, and later discussed in detail.

(a) Prepare a limited volume of the prototype, which is the desired milk, by any suitable manner.

(b) Equilibrate any cation-exchange resin with an excess of the prototype; this equilibrated resin is called "matrix" in the following. Remove the adherent prototype from the matrix by rinsing it briefly.

(c) Prepare a regenerant solution of a concentration which is economically advantageous, of such a composition that this regenerant cannot change the composition of an ion-exchange resin which is equilibrated with a prototype of the desired milk.

(d) Regenerate a bed of any cation resin with an excess of the regenerant described in (c).

(e) Rinse this equilibrated resin bed (d) free of excess salt, and pass the untreated milk through the resin bed. Milk of the composition of the prototype will appear as the effluent.

(f) After break-through, rinse briefly with water to free the resin bed of excess milk, and regenerate the resin bed again with the regenerant described in (c).

Ad. (a) Preparation of a prototype. If as the prototype there is used milk of low-sodium content, it can be prepared in one of several ways: e.g.

The Rohm & Haas booklet IE-4-52 describes a process for a sodium-free milk which is called "hardening process." It consists in mixing together in a predetermined ratio three portions of milk, in one of which all cations have been replaced with calcium, in another with magnesium, and in the third with potassium. It is mentioned there that a correctly blended milk has practically a zero sodium content, and calcium and potassium levels are only slightly altered from those found in raw milk. Although the preparation of such a milk is believed cumbersome and expensive, it is only necessary to prepare small quantities of such milk as a prototype for the preparation of a matrix.

Another sodium-free milk which can be used as a prototype can be made by a process of complete deionization, as described in U.S. Patent No. 2,708,632, issued May 17, 1955, to Edwin G. Stimpson, followed by the addition of the removed calcium, magnesium, and potassium salts in a desired ratio as well as total concentration, such as that in which they occur in natural milk. Still another sodium-free milk which can be used as a prototype can be prepared by the methods described in U.S. Patent No. 2,511,825, issued June 13, 1950, to R. J. Myers.

Ad. (c) Preparation of a regenerant solution. Regenerant solutions can be prepared in several ways. Higher concentrations, e.g. those having a total salt content of 40–300 m. eq. per 100 cc. are more economical because they shorten the time necessary for the regeneration or preparation of the resin bed. The regeneration solution can be prepared in a wide range of concentration and each concentration will have a different prescribed composition.

However, all these regenerant solutions, with different concentrations and compositions should not change the composition of an ion-exchange resin which is equilibrated with a prototype of the desired milk. In FIGURE 1 the compositions of equilibrated regenerant solutions with varying ionic strength are given (line 1' for calcium, line 3' for potassium, and line 5' for magnesium). These regenerant solutions are in equilibrium with matrices consisting of IR-120 in which the K:Ca:Mg ratio was 35:59:6, and which were obtained by equilibration with a desired prototype of low-sodium milk having a ratio of Ca:K:Mg approximating that of normal milk. Referring to FIG. 1, if a dilute regenerant were desired, it would consist largely of potassium, while the preferred concentrated regenerant solution would consist of a major part of calcium, with less potassium and magnesium.

The information relating to the composition of a regenerating solution of a given total cation concentration can be obtained in the following ways:

(1) After a matrix has been prepared, it is brought in equilibrium with a salt solution which is hereinafter called "displacing solution." The cation composition of the displacing solution is not critical; however, it has often been found advantageous to use a composition and total concentration which are close to those of the regenerating solution.

While in the preparation of the matrix a large amount of liquid is contacted with a small amount of cation-exchange resin, in the equilibration of the displacing solution a large amount of resin is contacted with a small amount of liquid. In order to prevent dilution of the displacing solution by the water which is present in the matrix, it is advantageous to remove excess water from the matrix before use. The equilibration itself can be performed either by a single batch or multiple batch procedure or by a column process. In the latter case it is advantageous to fill the column completely with a dewatered matrix, allow the displacing solution, containing preferably some of an extraneous mineral, e.g., sodium chloride, to pass upward very slowly, collect portions of the effluent, and analyze a part of such effluent before breakthrough of the sodium (which serves as a tracer) occurs.

(2) Another method for determining compositions for suitable regenerants that are in equilibrium with the matrix is based on systematic interpolations and trial and error.

In accordance with the analysis of the equilibrium regenerating solution as determined above, a large amount of a regenerating solution is then prepared. The fitness of the regenerant solution can be tested in a simple way. If the same cation-exchange resin from which the matrix has been prepared is equilibrated with the regenerant solution, this equilibrated resin will have the same ionic composition as the matrix.

(B) A process similar to the described in "A" above can also be used if no prototype is available. This method is illustrated by the following example of the preparation of low sodium milk.

A small amount of cation-exchange resin is equilibrated with a large excess of sodium-containing milk. The resin is washed with water and analyzed for its content of calcium, magnesium, potassium and sodium. The resin is then adjusted by excluding sodium, which can be excluded in various ways. If the content of the equilibrated resin, in mol-equivalents of calcium is "$a$," magnesium "$b$," potassium "$c$," and sodium "$d$," then the composition of a suitable cation-exchange resin which does not contain sodium, and which exchanges for the sodium in the milk a mixture of calcium, magnesium and potassium, contains these three ions in the ratio of $a:b:c$. For the preparation of a matrix, three portions of an ion-exchange resin, which are, respectively, in calcium, in magnesium, and in potassium cycle, are mixed in the ratio of $a:b:c$. This matrix can be used to treat displacing solutions as described under $c$, and regeneration solutions and the resin bed can be prepared as described under $d$, $e$, and $f$.

(C) Another process, which uses neither a prototype nor a matrix, is also demonstrated in the following example of the preparation of low sodium milk:

A small amount of cation-exchange resin is equilibrated with sodium-containing (normal) milk, and the equilibrated resin is used to treat a displacing solution, as described in $c$ and ad. $c$. The effluent will contain sodium in addition to calcium, magnesium and potassium. A regenerant is prepared, which has the same total equivalent ionic concentration as the effluent, but from which sodium is excluded, and in which only calcium, magnesium and potassium are present in ionic ratios corresponding to that in the effluent.

(D) Another process, which is limited to a low sodium milk of desirable composition, uses neither a prototype nor a matrix, nor a displacing solution, but is based on our findings that regenerating solutions preferably having a total salt content of 40–300 m. eq./100 cc. may be used, which solutions will produce a resin that is in equilibrium with the desired low-sodium milk that is coagulable with rennet even though the desired milk has a much lower salt content than the regenerating solution. Referring to FIG. 1, the area within the band or envelope defined by the lines 1—2 defines the calcium concentration of such regenerants, while the areas within the bands 3—4 and 5—6 define the concentrations of potassium and magnesium, respectively. Accordingly, any cation-exchange resin is regenerated with a solution of a desired total ionic concentration chosen from the abscissa of FIG. 1 and containing calcium, magnesium and potassium preferably in the form of their chlorides in the amounts of the corresponding ordinates within the envelopes described (and such that the total composition is 100%). If through any cation-exchange resin which is regenerated with such a solution, milk of normal mineral composition is passed, then a desirable low-sodium milk that is coagulable with rennet will be obtained. For the sake of economy, the total ionic concentration is preferably chosen within the higher range, e.g., above a level of 40 m. eq./100 cc. For example, a regenerant containing 151 m. eq./100 g., divided among potassium=53.4%, calcium=36.9%, and magnesium=9.8%, gave an acceptable low-sodium milk of only slightly reduced calcium content and of substantially normal flavor and rennet coagulability; its cationic composition, in m.eq./100 m.eq., was K=48, Ca=46, and Mg=6. A regenerant containing 143 m. eq./100 g., divided among K=65.8%, Ca=27.5% and Mg=6.9%, gave a low-sodium milk of borderline acceptability; its content of calcium plus magnesium was reduced 16% relatively, its coagulability by rennet was slightly impaired, and its flavor somewhat watery. A regenerant containing 140 m. eq./100 cc., divided among K=4%, Ca=90%, and Mg=6%, gave a milk of borderline acceptability because of its high ratio of Ca:K, and its coagulability by mere heating at 50–60° C. for 15–30 min., its cationic composition, in m. eq./100 m.eq. was K=11, Ca=82, Mg=7. By selecting values on the lines 1', 3', and 5', the regenerant solution will produce a resin which will be in equilibrium with a low-sodium milk that has substantially the same ionic ratios of Ca:K:Mg as in normal milk, and which resin will therefore produce such a milk in an ion-exchange process. The composition of such a treated milk may be, for example (in m.eq. per 100 m. eq.):K=42, Ca=50, Mg=7. Minor variations around these values can be easily made as desired by one skilled in the art.

The invention will be further illustrated by the following examples.

EXAMPLE 1

In the preparation of a resin composition for use in preparing a sodium-free milk, the procedure B described above was used. A resin in equilibrium with normal milk was taken as a guide. As the cation-exchange resin, there was chosen Amberlite IR–120, made by the Rohm & Haas Company. The milk which was used was pasteurized skim milk, which contained 0.04 gram of fat and 61 milligrams of sodium per 100 cc. Quantities of resin, 20 cc. each, were treated in columns with 2200 cc. of milk, and then rinsed with water until free of absorbed milk. These resins were originally in calcium cycle, potassium cycle, and mixed calcium-and-potassium cycle, respectively. Since analyses showed all three had practically the same composition after being treated, they must have been practically at equilibrium with the milk. The mole equivalent percentages of the cations in the resin were: potassium 32%, calcium 53.2%, magnesium 5.8%, and sodium 9%. A resin was then made up with the same ionic concentration ratios, but sodium was excluded completely. This mixture was made by uniformly mixing 32 parts by volume of resin in potassium cycle, 53.2 parts by volume of the resin in calcium cycle, and 5.8 parts by volume of resin in magnesium cycle, but no sodium. Therefore, the mole equivalent fractions in the mixture were: for potassium 35.1%, calcium 58.5%, and magnesium 6.4%.

Regenerant solutions containing a mixture of potassium, calcium, and magnesium chlorides were prepared as follows. Samples of the dry mixed resin were packed into columns 120 centimeters high and 0.8 or 1.2 centimeters in bore. Displacing solutions containing sodium chloride were passed very slowly up through the columns over a period of several days. Constancy of conductivity and of metal analyses for successive samples of effluent were used as criteria of equilibrium with unchanged resins. The analyses of equilibrated effluents are stated in Table I below.

*Table I*

| | Milli-Equivalents of Chloride per 100 cc. | Milli-Equivalents of Cations per 100 cc. | Mole Equivalent Fraction Times 100 | | | |
|---|---|---|---|---|---|---|
| | | | Potassium | Calcium | Magnesium | Sodium |
| A | 171 | 173 | 37 | 49 | 14 | 0.02 |
| B | 85 | 88 | 49.5 | 40 | 10.5 | 0.04 |
| C | 17.1 | 17.0 | 77 | 17.5 | 5.4 | 0.1 |
| D | 1.7 | 1.7 | 95.6 | 2.8 | 1.4 | 0.5 |

Solutions having each of the effluent compositions shown in Table I above were made up by dissolving the metal chlorides in water and used to regenerate the resin to the mixed cycle suited for producing low-sodium milk. However, the higher concentrations of regenerants are preferred. 500 liters of resin IR–120 in a column were exhaustively treated with a regenerant solution having the composition of sample A of Table I. The equilibrated resin was then rinsed with water and skim milk was passed through the column of 500 liters, or 1 volume, of the mixed resin. Sodium contents of successive volumes of outflowing milk were 10, 10, 33, 115, 175, 300 and 530 parts per million of sodium. These values show that between 2 and 3 volumes of milk were passed before sodium broke through. The flow of milk was lowered from the initial rate of 0.1 volume per minute to a rate of 0.066 volume per minute just before breakthrough.

The treated milk had the composition D, in terms of total metals, shown in Table II below. The original milk had composition A, in terms of total metals, and approximately composition B, in terms of apparent ionic concentrations (as defined by Coulter et al., Analytical Chemistry, volume 26, 1923). The values C were calculated from A and B according to the theory that the apparent ionic concentrations of potassium, calcium, magnesium increase proportionally, while the concentrations of their un-ionized forms remain relatively unchanged. The calculated values, C, are close to those actually found, D. Thus, the apparent ionic concentration ratios, except sodium, have been kept substantially unchanged.

Table II
CATIONIC COMPOSITION OF MILKS

| Compositions | | Potassium | Calcium | Magnesium | Sodium | Total |
|---|---|---|---|---|---|---|
| Observed, Untreated, total | (A)m* | 3.6 | 6.8 | 1.1 | 2.6 | 14.1 |
| | (A)% * | 26 | 48 | 8 | 18 | 100 |
| Estimated, Untreated, Ionic | (B)m* | 3.6 | 0.44 | 0.17 | 2.6 | 6.8 |
| | (B)% * | 53 | 6.5 | 2.5 | 38 | 100 |
| Calculated, Treated, ionic | (C)m* | 5.8 | 7.1 | 1.2 | | 14.1 |
| | (C)% * | 41.3 | 50.3 | 8.4 | | 100 |
| Observed, treated, total | (D)m* | 5.94 | 7.14 | 1.02 | | 14.1 |
| | (D)% * | 42.1 | 50.5 | 7.2 | | 100 |

*m = milli-equivalents per 100 cc.; % = mole equivalent fraction times 100.

The ionic concentration ratios of potassium, calcium, and magnesium in the milk product were substantially the same as those in the skim milk and the low-sodium milk product was coagulable with rennet and had the flavor and appearance of the skim milk.

EXAMPLE 2

In this example the procedure A outlined above was used. A "hardened" milk of composition, in m. eq./100 ml., K=3.20, Ca=7.32, Mg=0.86, and Na=0.38, was prepared as a prototype by mixing skim milk samples made by ion exchange treatment in K, Ca, and Mg cycles, respectively, as described in booklet 1E–4–52 by the Rohm & Haas Company. Six liters of the mixed milk were slowly passed through 100 cc. of Amberlite IR–120 over a period of 3 hours. The resin was centrifuged free of interstitial milk, rinsed well with water, and again centrifuged to remove water. Of this resin 50 cc. were now placed in a column, and a mixed aqueous displacing solution of potassium, calcium, and magnesium chlorides at levels of 45, 37 and 10 m. eq./100 ml., respectively, was passed up through the bed very slowly. After the first 6 cc. had flowed through, the effluent was no longer more dilute than the inflowing solution. The next 18 cc. of effluent had the following composition determined by analysis, in m. eq./100 ml.:KCl=25.6, CaCl$_2$=50.6, MgCl$_2$=18, NaCl=1.6. Using the pure salts, 2 l. of solution was then made so as to contain the following, in m. eq./100 ml.:KCl=26, CaCl$_2$=51, MgCl$_2$=18. This solution was used to regenerate 120 cc. of IR–120 resin. Through this resin, 200 cc. of skim milk was passed. The effluent had the following composition, in m. eq./100 ml.: K 4.2, Ca 6.5, Mg 1.1, and gave a much harder rennet curd than that obtained from normal skim milk.

EXAMPLE 3

A column of 1 cu. ft. of Amberlite IR–120 was regenerated with 40 gal. of a magnesium-free solution containing 31 m. eq./100 ml. of KCl, 36 m. eq./100 ml. of CaCl$_2$ and 23 m. eq./100 ml. of NaCl, at a flow rate of ¾ gal./min. The composition of the regenerant used was determined as follows, by method C. A sample of Amberlite IR–120 which had been equilibrated with a large excess of skim milk was used to treat a relatively small amount of lithium chloride solution containing 108 m. eq. in 100 cc. The effluent had the following composition as to the cations of interest, in m. eq./100 g.:K=31, Na=23, Ca=36, Mg=12.5. The chosen regenerant concentrations described above were approximately the same as these, excepting magnesium chloride, which was omitted. The column was rinsed with water, and then 24 gal. of skim milk were passed through at a rate of ⅓ gal./min. The effluent, which had a pH value of 6.8, was spray dried to a powder having the following analysis, in percent by weight: Mg=0.01, Na=1.13, K=1.46, Ca=1.32, P=1.05, N=5.72, ash=8.61. Compared with normal skim milk, this low-magnesium skim milk had substantially all of its magnesium replaced by sodium, while the other constituents remained substantially unaltered. This product has been found to give superior milk gels.

Various modifications and changes may be made in the invention herein set forth without departing from the spirit thereof, and accordingly, the appended claims include all such modifications and changes within their scope.

We claim:

1. A process for changing the concentration of one of the cations of milk to produce a desired milk product which comprises treating milk with a cation exchanger which is in equilibrium with the desired milk, and regenerating said cation exchanger after breakthrough with a regenerant solution which has the same ionic ratios and composition as a salt solution which has been equilibrated with another cation exchanger which is in equilibrium with the desired milk.

2. The process of claim 1 wherein said one cation is magnesium.

3. The process of claim 2 wherein the concentration of magnesium in the milk product is between zero and a substantially reduced concentration as compared with normal milk.

4. The process for the production of a low-sodium milk product which is coagulable with rennet and which has a ratio of ionic concentrations of potassium, calcium, and magnesium ions substantially the same as the ionic concentration ratios in normal milk comprising contacting the milk with a substantially sodium-free cation exchange resin having potassium, calcium, and magnesium ions bound thereon that are in equilibrium wtih the concentration of such ions in said milk product, and regenerating said cation exchanger after breakthrough with a regenerant solution which has the same ionic ratios and composition as a salt solution which has been equilibrated with another cation exchanger which is in equilibrium with the desired milk.

5. The process for the production of a low-sodium milk product which is coagulable with rennet and which has a ratio of ionic concentrations of potassium, calcium, and magnesium ions substantially the same as the ionic concentration ratios in normal milk comprising passing the milk through a bed of a substantially sodium-free cation exchange resin having potassium, calcium, and magnesium ions bound thereon that are in equilibrium with the concentration of such ions in said milk product, and regenerating said cation exchanger after breakthrough with a regenerant solution which has the same ionic ratios and composition as a salt-solution which has been equilibrated with another cation exchanger which is in equilibrium with the desired milk.

6. The process of preparing a low-sodium milk by means of contacting a milk of normal content of sodium, calcium, potassium and magnesium with a cation exchanger which has been regenerated with a mixed salt solution so as to be near equilibrium with a milk which contains between zero and a substantially reduced concentration of sodium, which is coagulable by rennet, and which is substantially unaltered in appearance, flavor, and the ratios among the other ions, and regenerating said cation exchanger after breakthrough with a regenerant solution which has the same ionic ratios and composition as a salt solution which has been equilibrated with another cation exchanger which is in equilibrium with the desired milk.

7. The process of modifying a milk so as to replicate the ionic composition of a specific milk, which process comprises equilibrating an ion exchanger with an excess of the specific milk, determining the compositions of salt solutions that are near equilibrium with the aforementioned equilibrated ion exchanger, regenerating a second spent cation exchanger with such a salt solution and contacting a milk to be modified with the regenerated exchanger.

8. The process for the production of a low-sodium milk, which is coagulable with rennet and which has a ratio of ionic concentrations of potassium, calcium and magnesium ions substantially the same as the ionic concentration ratios in normal milk, comprising equilibrating a first cation exchange resin with milk, preparing of a second modified cation exchange resin, which contains potassium, calcium, and magnesium in ratios substantially equal to those present in the first equilibrated cation exchange resin, determining the composition of salt solutions that are near equilibrium with the aforementioned second modified ion exchanger, regenerating a third spent exchanger with such a salt solution and contacting a milk to be modified with the third regenerated exchanger.

9. The process for the production of a low-sodium milk, which is coagulable with rennet and which has a ratio of ionic concentrations of potassium, calcium and magnesium ions substantially the same as the ionic concentration ratios in normal milk comprising the steps of equilibrating a first cation exchange resin with milk, determining the composition of a salt solution which is in equilibrium with the aforementioned ion exchanger, and preparing a regenerant solution which contains the same equivalent concentrations of potassium, calcium and magnesium as said salt solution but which is substantially free of sodium, regenerating with the regenerant a second spent cation exchanger and contacting milk to be modified with the regenerated exchanger.

10. The process of producing a milk which contains calcium, potassium and magnesium ions and which contains between zero and a substantially reduced concentration of sodium, which is coagulable by rennet, and which is substantially unaltered in appearance, flavor, and the ratios among the other ions, by means of contacting a milk of normal sodium content with a cation exchanger which has been previously exhaustively regenerated with a solution having calcium concentration within the envelope 1—2, a potassium concentration within the envelope 3—4, and a magnesium concentration within the envelope 5—6 of FIGURE 1.

11. The process of claim 10 wherein the concentration of the regenerant solution is in the range 40–300 milliequivalents per 100 cc.

12. The process of claim 10 wherein the calcium concentration is determined by the line 1', the potassium concentration is determined by the line 3', and the magnesium concentration is determined by the line 5' of FIGURE 1.

13. The process of claim 12 wherein the concentration of the regenerant solution is in the range 40–300 milliequivalents per 100 cc.

14. An aqueous regenerant solution for a cation exchanger for milk, consisting essentially of calcium chloride in a concentration within the envelope 1—2, potassium chloride in a concentration within the envelope 3—4, and magnesium chloride in a concentration within the envelope 5—6 of FIGURE 1.

15. A regenerant solution as described in claim 14 wherein the total concentration of chlorides is 40–300 milliequivalents per 100 cc.

16. A regenerant solution as described in claim 14 wherein the calcium concentration is determined by the line 1'', the potassium concentration is determined by the line 3', and the magnesium concentration is determined by the line 5' of FIGURE 1.

17. A regenerant solution as described in claim 16 wherein the total concentration of chlorides is 40–300 milliequivalents per 100 cc.

References Cited in the file of this patent

UNITED STATES PATENTS

| | | |
|---|---|---|
| 2,228,160 | Wassenegger et al. | Jan. 7, 1941 |
| 2,511,825 | Meyers | June 13, 1950 |

OTHER REFERENCES

Science, vol. 110, Nov. 25, 1949, pp. 556 to 558.